Feb. 14, 1933. W. J. FERGUSON 1,897,248
HOSE HANGER
Filed June 4, 1932
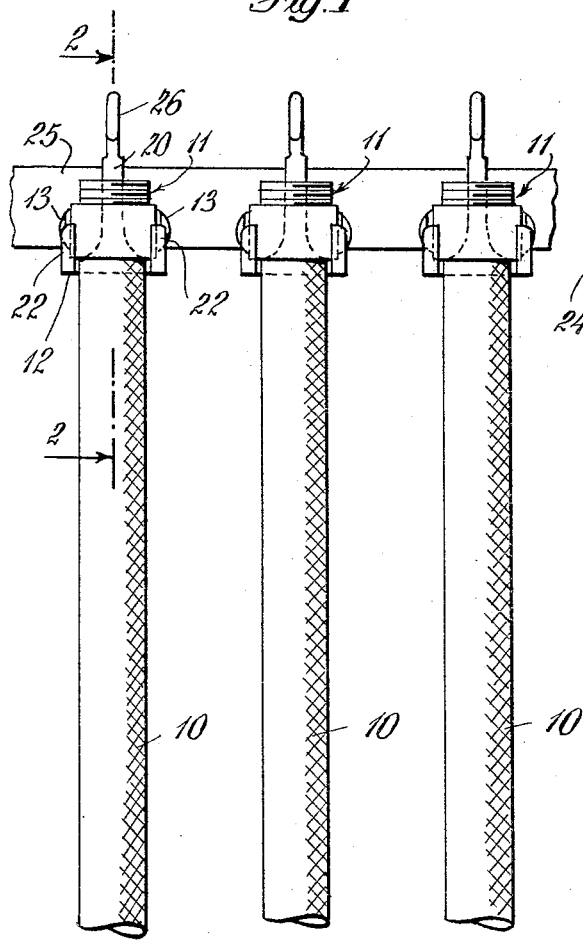
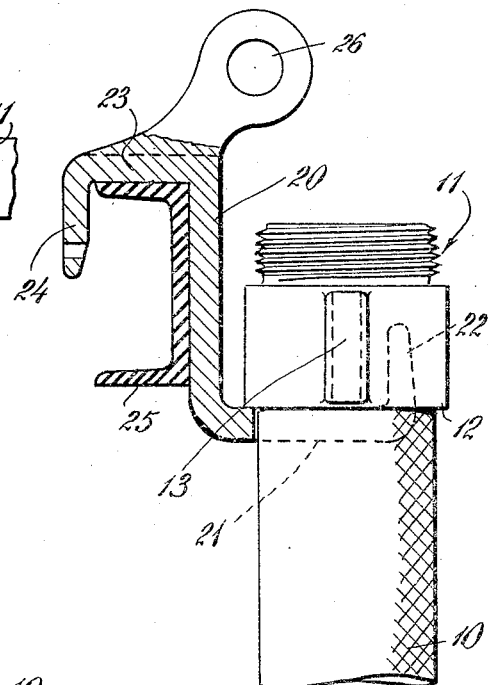
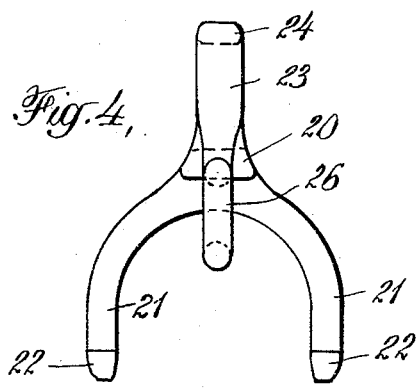
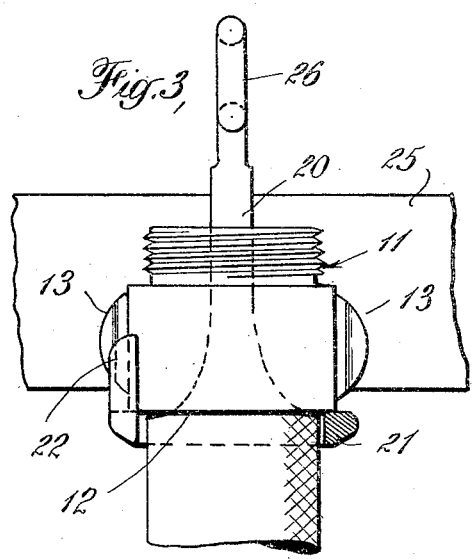
INVENTOR
Wm. J. FERGUSON
BY
Marshall & Hawley
ATTORNEYS Patented Feb. 14, 1933

1,897,248

UNITED STATES PATENT OFFICE

WILLIAM J. FERGUSON, OF YONKERS, NEW YORK, ASSIGNOR OF ONE-HALF TO BENJAMIN GELLER, OF YONKERS, NEW YORK

HOSE HANGER

Application filed June 4, 1932. Serial No. 615,327.

This invention relates to improvements in hose hangers for raising and supporting wet fire hose in the drying tower or for storing a supply of extra hose for use in emergencies.

Its object is to provide a simple and effective device by means of which the handling of the hose may be facilitated, from which the hose will hang with no unequal strains on the hose coupling and by which the hose is securely and safely supported without danger of falling.

Other objects of the invention will appear in the following specification in which I will describe the invention, the novel features of which I will set forth in appended claims.

Referring to the drawing in which like characters of reference designate corresponding parts in the several figures, Fig. 1 is a front elevation of a plurality of the novel hose hangers in use;

Fig. 2 is a sectional side elevation of a hose hanger which is made according to and embodies this invention, together with the upper end of a hose with a coupling thereon of standard construction. This view is taken on the line 2—2 of Fig. 1 and is drawn on a larger scale;

Fig. 3 is a front elevation of the parts shown in Fig. 2; and

Fig. 4 is a plan view of the device.

10 designates a fire hose having a coupling member 11 on the end thereof. In the drawing, a "bi-lateral" coupling is illustrated,—a standard construction of approved form. The lower end of this coupling is of larger diameter than that of the hose and forms a shoulder 12 which projects beyond the periphery of the hose itself. 13, 13 are lugs projecting from diametrically opposite sides of the coupling.

20 is a vertical post, from the lower end of which two arms 21, 21 project. The inside of these arms is formed on an arc, the radius of which is slightly more than half the diameter of the hose 10, but less than half the diameter of the coupling 11. These arms project beyond the semi-circular part thus formed and the ends of them are turned up to form fingers 22, 22.

The upper end of the post 20 is bent backwardly and downwardly, as shown at 23, 24 respectively, to form a hook which is arranged to engage a beam 25 of a drying rack.

Extending upwardly from the portion 23 and to a limited degree over the fingers 22, 22 is an eye 26.

I will now describe the operation of the device: When it is desired to support a hose, its coupling 11 is placed upon the base formed by the arms 21, 21 with its lugs 13, 13 back of the fingers 22, 22. This is easily accomplished as there is plenty of clearance between the various parts, but when thus seated the coupling cannot be removed from the hanger except by being raised up above the tops of the fingers 22. When thus secured the hose may be raised by means of a rope secured to the eye 26 and raised upwardly until the hook formed by the members 20, 23 and 24 are sufficiently high to be placed over the beam 25. Then the parts are slightly lowered to assume the positions in which they are shown in Figs. 1, 2 and 3, after which the rope or tackle which has been attached to the eye 26 may be removed.

It is obvious that this operation may be reversed when it is desired to remove the hose from the drying racks. One standard form of coupling has been illustrated but the device is designed to engage in a similar manner with other forms of couplings so that it is arranged to operate with any form of fire hose coupling which is now in common use. The eye 26 is slightly offset to the front of post 20 for the purpose of bringing it over the center of gravity of the hose so that when the latter is being raised the post 20 will assume a substantially vertical position.

What I claim is:

1. A hose hanger comprising an upright post, bifurcated arms extending forwardly from the lower end of the post adapted to form a flat seat for a hose coupling having diametrical extending lugs, fingers projecting upwardly from the ends of said arms beyond the lugs on the hose coupling to prevent lateral movement of the coupling on said seat, an integral rigid portion extending backwardly from the upper end of the post and downwardly to form a hook adapted to engage a transverse supporting member.

2. A hose hanger comprising an upright post, bifurcated arms extending forwardly from the lower end of the post adapted to form a flat seat for a hose coupling having diametrical extending lugs, fingers projecting upwardly from the ends of said arms beyond the lugs on the hose coupling to prevent lateral movement of the coupling on said seat, an integral rigid portion extending backwardly from the upper end of the post and downwardly to form a hook adapted to engage a transverse supporting member, and a part extending upwardly from said backwardly extending portion forming engaging means for raising said hanger.

3. A hose hanger comprising an upright post, bifurcated arms extending forwardly from the lower end of the post adapted to form a flat seat for a hose coupling having diametrical extending lugs, fingers projecting upwardly from the ends of said arms beyond the lugs on the hose coupling to prevent lateral movement of the coupling on said seat, an integral rigid portion extending backwardly from the upper end of the post and downwardly to form a hook adapted to engage a transverse supporting member, and a ring-like part extending upwardly and forwardly from said backwardly extending portion forming engaging means over the hanger for raising said hanger.

WILLIAM J. FERGUSON.